United States Patent
Seregin et al.

(10) Patent No.: US 11,917,174 B2
(45) Date of Patent: Feb. 27, 2024

(54) DECODED PICTURE BUFFER (DPB) OPERATIONS AND ACCESS UNIT DELIMITER (AUD)

(71) Applicant: QUALCOMM Incorporated, San Diego, CA (US)

(72) Inventors: Vadim Seregin, San Diego, CA (US); Yong He, San Diego, CA (US); Muhammed Zeyd Coban, Carlsbad, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 206 days.

(21) Appl. No.: 17/338,468

(22) Filed: Jun. 3, 2021

(65) Prior Publication Data
US 2021/0385472 A1    Dec. 9, 2021

Related U.S. Application Data

(60) Provisional application No. 63/036,415, filed on Jun. 8, 2020.

(51) Int. Cl.
H04N 19/44 (2014.01)
H04N 19/30 (2014.01)
H04N 19/70 (2014.01)

(52) U.S. Cl.
CPC .............. *H04N 19/44* (2014.11); *H04N 19/30* (2014.11); *H04N 19/70* (2014.11)

(58) Field of Classification Search
None
See application file for complete search history.

(56) References Cited

U.S. PATENT DOCUMENTS

2019/0335179 A1*  10/2019  Sjöberg ............... H04N 19/132

OTHER PUBLICATIONS

Joshi, R., et al, "High Efficiency Video Coding (HEVC) Screen Content Coding: Draft 6", 23rd JCT-VC Meeting, Feb. 19, 2016-Feb. 26, 2016, San Diego, (Joint Collaborative Team on Video Coding of ISO/IEC JTC1/SC29/WG11 and ITU-T SG.16 WP 3), No. JCTVC-W1005-v4, Jun. 25, 2016 (Jun. 25, 2016), XP030242126, 672 pages. (Year: 2016).*

(Continued)

*Primary Examiner* — Stuart D Bennett
(74) *Attorney, Agent, or Firm* — Polsinelli LLP

(57) ABSTRACT

Systems, methods, and computer-readable storage media are provided for decoded picture buffer (DPB) operations and rewriting access unit delimiters (AUDs) after bitstream extractions. An example method can include storing one or more pictures associated with an access unit (AU) in a decoded picture buffer (DPB), the AU including a first plurality of pictures, the first plurality of pictures corresponding to a plurality of video coding layers; after each picture of a second plurality of pictures associated with the AU is removed from a coded picture buffer (CPB), removing at least one picture of the one or more pictures from the DPB; and storing, in the DPB, each picture of the second plurality of pictures removed from the CPB.

24 Claims, 9 Drawing Sheets

(56) References Cited

OTHER PUBLICATIONS

Joshi, R., et al, "High Efficiency Video Coding (HEVC) Screen Content Coding: Draft 6", 23rd JCT-VC Meeting, Feb. 19, 2016-Feb. 26, 2016, San Diego, (Joint Collaborative Team on Video Coding of ISO/IEC JTC1/SC29/WG11 and ITU-T SG 16 WP 3), No. JCTVC-W1005-v4, Jun. 25, 2016 (Jun. 25, 2016), XP03242126, 625 pages. (Year: 2016).*

He (Qualcomm) Y., et al., "AHG9: On AUD for Sub-Bitstream Extraction", 131. MPEG Meeting, Jun. 29, 2020-Jul. 3, 2020, Online, (Motion Picture Expert Group Oriso/IEC JTC1/SC29/WG11), No. m54233, JVET-80225, Jun. 11, 2020 (Jun. 11, 2020), XP030288457, 3 Pages, Retrieved from the Internet: URL:http://phenix.int-evry.fr/mpeg/doc_end_user/documents/131_Teleconference/wg11/m54233-JVET-S0225-v1-JVET-S0225.zip JVET-S0225.docx [retrieved on Jun. 11, 2020] the whole document.

International Search Report and Written Opinion—PCT/US2021/035999—ISA/EPO—dated Dec. 22, 2021.

Skupin (Fraunhofer) R., et al: "AHG9: On OLS Extraction", 131. Mpeg Meeting, Jun. 29, 2020-Jul. 3, 2020, Online, (Motion Picture Expert Group or ISO/IEC JTC1/SC29/WG11), No. m54088, JVET-S0102, May 22, 2020 (May 22, 2020), XP030289719, 4 Pages, Retrieved from the Internet: URL:http://phenix.int-evry.fr/mpeg/doc_end_user/documents/131_Teleconference/wg11/m54088-JVET-S0102-v1-JVET-S0102.docx.zip JVET-S0102. docx [retrieved on May 22, 2020] the whole document.

Bross B., et al., "Versatile Video Coding (Draft 9)", 130. MPEG Meeting, (Motion Picture Expert Group or ISO/IEC JTC1/SC29/WG11), Apr. 20, 2020-Apr. 24, 2020, Alpbach, 18th JVET Meeting, (ITU-T SG 16 WP 3 and ISO/IEC JTC 1/SC 29/WG11), Apr. 15, 2020-Apr. 24, 2020, No. JVET-R2001-vA, m53983, JVET-R2001, May 15, 2020 (May 15, 2020), XP030287936, 528 Pages, Retrieved from the Internet: URL:http://phenix.int-evry.fr/mpeg/doc_end_user/documents/130_Alpbach/wg11/m53983-JVET-R2001-v10-JVET-R2001-vA.zip JVET-R2001-vA.docx [retrieved on May 15, 2020] Sections 7.4.3.4. 7.4.8.1, Sections C.5.2.3, 7.4.3.9.

Joshi, R., et al., "High Efficiency Video Coding (HEVC) Screen Content Coding: Draft 6", 23rd JCT-VC Meeting, Feb. 19, 2016-Feb. 26, 2016, San Diego, (Joint Collaborative Team on Video Coding of ISO/IEC JTC1/SC29/WG11 and ITU-T SG.16 WP 3), No. JCTVC-W1005-v4, Jun. 25, 2016 (Jun. 25, 2016), XP030242126, 672 pages, Retrieved from the Internet: URL: http://phenix.int-evry.fr/jct/doc_end_user/documents/23_San%20Diego/wg11/JCTVC-W1005-v4.zip JCTVC-W1005-v4.doc [retrieved on Jun. 25, 2016] sections 7.3.8.13-7.3.8.15 sections 7.4.9.13-7.4.9.15 section 8.6, section 3.1, 3.25, F.7.3.2.1.3, F.7.4.3.1.3 and F.13.

Partial International Search Report—PCT/US2021/035999—ISA/EPO—dated Sep. 29, 2021.

Seregin (Qualcomm), V., et al., "AHG9: On Picture Bumping Process", 131. MPEG Meeting, Jun. 22, 2020-Jul. 1, 2020, online, (Motion Picture Expert Group or ISO/IEC JTC1/SC29/WG11), No. m54231, JVET-S0223 Jun. 11, 2020 (Jun. 11, 2020), XP030288454, 3 pages, Retrieved from the Internet: URL:http://phenix.int-evry.fr/mpeg/doc_end_user/documents/131_Teleconference/wg11/m54231-JVET-S0223-v1-JVET-S0223.zip JVET-S0223.docx [retrieved on Jun. 11, 2020] the whole document.

Tech (Fraunhofer), G., et al., "Preliminary Version of MV-HEVC Draft Text 9", 9. JCT-3V Meeting, Jul. 3, 2014-Jul. 9, 2014, Sapporo, (The Joint Collaborative Team on 3D Video Coding Extension Development of ISO/IEC JTC1/SC29/WG11 and ITU-T SG.16), No. JCT3V-I1002-v1, Jul. 10, 2014 (Jul. 10, 2014), XP030132530, 165 Pages, Retrieved from the Internet: URL: http://phenix.int-evry.fr/jct2/doc_end_user/documents/9_Sapporo/wg11/JCT3V-I1002-V1.zip JCT3V-11002_v1.doc [Retrieved on Jul. 10, 2014] sections 3, C and F.13, F.3.25-F.3.26, F.7.4.2.4.4.

* cited by examiner

500

STORE ONE OR MORE PICTURES ASSOCIATED WITH AN ACCESS UNIT (AU) IN A DECODED PICTURE BUFFER (DPB), THE AU INCLUDING A FIRST PLURALITY OF PICTURES
502

AFTER EACH PICTURE OF A SECOND PLURALITY OF PICTURES ASSOCIATED WITH THE AU IS REMOVED FROM A CODED PICTURE BUFFER (CPB), REMOVE AT LEAST ONE PICTURE OF THE ONE OR MORE PICTURES ASSOCIATED WITH THE AU FROM THE DPB
504

STORE, IN THE DPB, EACH PICTURE OF THE SECOND PLURALITY OF PICTURES REMOVED FROM THE CPB
506

FIG. 5

DECODED PICTURE BUFFER (DPB) OPERATIONS AND ACCESS UNIT DELIMITER (AUD)

CROSS-REFERENCE TO RELATED APPLICATIONS

This application claims priority to U.S. Provisional Application No. 63/036,415, filed Jun. 8, 2020, entitled "DECODED PICTURE BUFFER (DPB) OPERATIONS AND ACCESS UNIT DELIMITER (AUD)", the contents of which are hereby incorporated by reference in their entirety and for all purposes.

TECHNICAL FIELD

This application is generally related to video encoding and decoding and, more specifically, improving video coding techniques related to the decoded picture buffer (DPB) and the access unit delimiter (AUD).

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Such devices allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Digital video devices can implement video coding techniques to compress video data. Video coding is performed according to one or more video coding standards or formats. For example, video coding standards or formats include versatile video coding (VVC), high-efficiency video coding (HEVC), advanced video coding (AVC), MPEG-2 Part 2 coding (MPEG stands for moving picture experts group), among others, as well as proprietary video codecs/formats such as AOMedia Video 1 (AV1) that was developed by the Alliance for Open Media. Video coding generally utilizes prediction methods (e.g., inter prediction, intra prediction, or the like) that take advantage of redundancy present in video images or sequences. A goal of video coding techniques is to compress video data into a form that uses a lower bit rate, while avoiding or minimizing degradations to video quality. With ever-evolving video services becoming available, coding techniques with better coding efficiency are needed.

BRIEF SUMMARY

Disclosed are systems, methods, and computer-readable media for decoded picture buffer (DPB) operations and rewriting access unit delimiters (AUDs) after bitstream extractions. According to at least one example, a method is provided for processing video, such as performing decoded picture buffer (DPB) operations and rewriting access unit delimiters (AUDs) after bitstream extractions. An example method can include storing one or more pictures associated with an access unit (AU) in a decoded picture buffer (DPB), the AU including a first plurality of pictures, the first plurality of pictures corresponding to a plurality of video coding layers; after each picture of a second plurality of pictures associated with the AU is removed from a coded picture buffer (CPB), removing at least one picture of the one or more pictures associated with the AU from the DPB; and storing, in the DPB, each picture of the second plurality of pictures removed from the CPB.

According to at least one example, a non-transitory computer-readable medium is provided that includes instructions which, when executed by one or more processors, cause the one or more processors to: store one or more pictures associated with an access unit (AU) in a decoded picture buffer (DPB), the AU including a first plurality of pictures of pictures, the first plurality of pictures of pictures corresponding to a plurality of video coding layers; after each picture of a second plurality of pictures is removed from a coded picture buffer (CPB), remove at least one picture of the one or more pictures associated with the AU from the DPB; and store, in the DPB, each picture of the second plurality of pictures removed from the CPB.

According to at least one example, an apparatus is provided for processing video data, such as performing decoded picture buffer (DPB) operations and rewriting access unit delimiters (AUDs) after bitstream extractions. An example apparatus can include at least one memory and one or more processors (e.g., implemented in circuitry) coupled to the memory. The one or more processors are configured to: store one or more pictures associated with an access unit (AU) in a decoded picture buffer (DPB), the AU including a first plurality of pictures, the first plurality of pictures corresponding to a plurality of video coding layers; after each picture of a second plurality of pictures is removed from a coded picture buffer (CPB), remove at least one picture of the one or more pictures associated with the AU from the DPB; and store, in the DPB, each picture of the second plurality of pictures removed from the CPB.

According to at least one example, another apparatus is provided for processing video data, such as performing decoded picture buffer (DPB) operations and rewriting access unit delimiters (AUDs) after bitstream extractions. An example of the apparatus can include: means for storing one or more pictures associated with an access unit (AU) in a decoded picture buffer (DPB), the AU including a first plurality of pictures, the first plurality of pictures corresponding to a plurality of video coding layers; means for removing at least one picture of the one or more pictures associated with the AU from the DPB after each picture of a second plurality of pictures is removed from a coded picture buffer (CPB); and means for storing, in the DPB, each picture of the second plurality of pictures removed from the CPB.

In some aspects, the method, non-transitory computer-readable medium, and apparatuses described above can remove the at least one picture of the one or more pictures from the DPB after a last decoding unit (DU) of each picture is removed from the CPB.

In some aspects, the method, non-transitory computer-readable medium, and apparatuses described above can mark the at least one picture of the one or more pictures in the DPB for removal from the DPB; and based on the marking of the at least one picture of the one or more pictures in the DPB, remove the at least one picture of the one or more pictures from the DPB.

In some aspects, the method, non-transitory computer-readable medium, and apparatuses described above can set a respective flag associated with the at least one picture of the one or more pictures, the respective flag indicating that the at least one picture of the one or more pictures is set for output from the DPB.

In some examples, the DPB has a size limit that is signaled via a syntax element that defines the size limit of the DPB. In some cases, the size limit is less than at least a portion of the first plurality of pictures associated with the AU.

In some examples, the at least one picture of the one or more pictures is removed from the DPB and each picture of the second plurality of pictures is stored in the DPB prior to an amount of used storage of the DPB reaching a size limit of the DPB.

In some cases, the one or more pictures stored in the DPB can include a reference picture and/or a decoded picture. In some cases, the at least one of the one or more pictures removed from the DPB can include different pictures from a same layer of the plurality of video coding layers. In some cases, the at least one of the one or more pictures removed from the DPB can include different pictures from different layers of the plurality of video coding layers.

In some examples, each video coding layer among the plurality of video coding layers is associated with a same output time from the DPB.

In some aspects, the method, non-transitory computer-readable medium, and apparatuses described above can extract a second AU from at least a portion of a bitstream; determine that the second AU includes only one or more intra random access point (TRAP) pictures or only one or more gradual decoder refresh (GDR) pictures; and based on the determining that the second AU includes only one or more TRAP pictures or only one or more GDR pictures, set a value of a flag of an AU delimiter (AUD) associated with the second AU to 1. In some examples, the value of the flag when set to 1 indicates that the second AU contains only one or more IRAP pictures or only one or more GDR pictures.

In some examples, the flag includes an AUD TRAP or GDR flag, and the second AU includes a single video coding layer and/or a single coded picture. In some cases, the single video coding layer and/or the single coded picture can include only the one or more TRAP pictures or only the one or more GDR pictures.

In some cases, setting the value of the flag of the AUD to 1 can include changing the value of the flag from 0 to 1 based on a determination that, after the extracting of the second AU, the second AU is an IRAP AU or a GDR AU.

In some aspects, any of the apparatuses described above can include a mobile device with a camera for capturing one or more pictures. In some aspects, any of the apparatuses described above can include a display for displaying one or more pictures.

According to at least one example, a method is provided for processing video. The method can include: obtaining a bitstream of video data; extracting an access unit (AU) from at least a portion of the bitstream; determining that the AU comprises only one or more intra random access point pictures or only one or more gradual decoder refresh pictures; and based on the determining that the AU comprises only one or more TRAP pictures or only one or more GDR pictures, setting a value of a flag of an AU delimiter associated with the AU to 1, wherein the flag having the value set to 1 indicates that the AU contains only one or more TRAP pictures or only one or more GDR pictures.

According to at least one example, a non-transitory computer-readable medium is provided that includes instructions which, when executed by one or more processors, cause the one or more processors to: obtain a bitstream of video data; extract an access unit (AU) from at least a portion of the bitstream; determine that the AU comprises only one or more intra random access point pictures or only one or more gradual decoder refresh pictures; and based on the determining that the AU comprises only one or more TRAP pictures or only one or more GDR pictures, set a value of a flag of an AU delimiter associated with the AU to 1, wherein the flag having the value set to 1 indicates that the AU contains only one or more TRAP pictures or only one or more GDR pictures.

According to at least one example, an apparatus is provided for processing video data. The apparatus can include at least one memory and one or more processors (e.g., implemented in circuitry) coupled to the memory. The one or more processors are configured to: obtain a bitstream of video data; extract an access unit (AU) from at least a portion of the bitstream; determine that the AU comprises only one or more intra random access point pictures or only one or more gradual decoder refresh pictures; and based on the determining that the AU comprises only one or more TRAP pictures or only one or more GDR pictures, set a value of a flag of an AU delimiter associated with the AU to 1, wherein the flag having the value set to 1 indicates that the AU contains only one or more IRAP pictures or only one or more GDR pictures.

According to at least one example, another apparatus is provided for processing video data. The apparatus can include: means for obtaining a bitstream of video data; means for extracting an access unit (AU) from at least a portion of the bitstream; means for determining that the AU comprises only one or more intra random access point pictures or only one or more gradual decoder refresh pictures; and means for setting a value of a flag of an AU delimiter associated with the AU to 1 based on the determining that the AU comprises only one or more IRAP pictures or only one or more GDR pictures, wherein the flag having the value set to 1 indicates that the AU contains only one or more IRAP pictures or only one or more GDR pictures In some aspects, the flag comprises an AUD TRAP or GDR flag.

In some aspects, the AU comprises at least one of a single video coding layer and a single coded picture. In some cases, the at least one of the single video coding layer and the single coded picture comprises only the one or more TRAP pictures or only the one or more GDR pictures.

In some aspects, the method, non-transitory computer-readable medium, and apparatuses described above can: determine that, after the extracting of the AU, the AU is an IRAP AU or a GDR AU; and change the value of the flag from 0 to 1 based on the determining that, after the extracting of the AU, the AU is an IRAP AU or a GDR AU.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

In order to describe the manner in which the various advantages and features of the disclosure can be obtained, a more particular description of the principles described above will be rendered by reference to specific embodiments thereof, which are illustrated in the appended drawings. Understanding that these drawings depict only example embodiments of the disclosure and are not to be considered to limit its scope, the principles herein are described and explained with additional specificity and detail through the use of the drawings in which:

FIG. 5 is a flowchart illustrating an example process for decoder picture buffer operations, in accordance with some examples of the disclosure;

DETAILED DESCRIPTION

Figure 1:
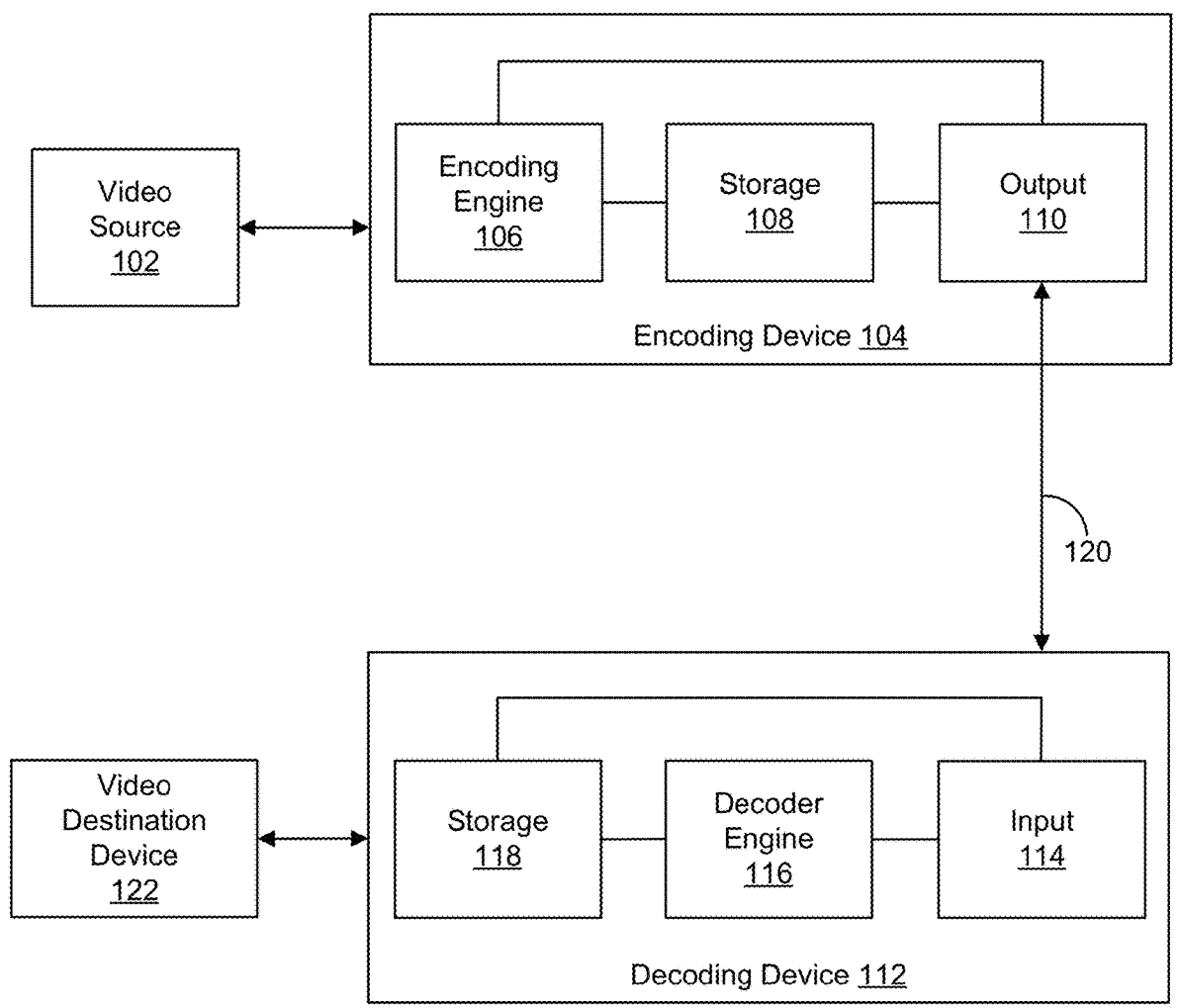
FIG. 1 is a block diagram illustrating an example of an encoding device and a decoding device, in accordance with some examples of the disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Video coding devices implement video compression techniques to encode and decode video data efficiently. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data), and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill). Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. The video encoder may restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder may determine a prediction error. For example, the prediction can be determined as the difference between the pixel values in the block being encoded and the predicted block. The prediction error can also be referred to as the residual. The video encoder may also apply a transform to the prediction error (e.g., a discrete cosine transform (DCT) or other suitable transform) to generate transform coefficients. After transformation, the video encoder may quantize the transform coefficients. The quantized transform coefficients and motion vectors may be represented using syntax elements and, along with control information, form a coded representation of a video sequence. In some instances, the video encoder may entropy code syntax elements, thereby further reducing the number of bits needed for their representation.

A video decoder may construct, using the syntax elements and control information discussed above, predictive data (e.g., a predictive block) for decoding a current frame. For example, the video decoder may add the predicted block and the compressed prediction error. The video decoder may determine the compressed prediction error by weighting the transform basis functions using the quantized coefficients.

The difference between the reconstructed frame and the original frame is called reconstruction error.

In some aspects, systems, apparatuses, processes (also referred to as methods), and computer-readable media (collectively referred to herein as "systems and techniques") are described herein for decoded picture buffer (DPB) operations and rewriting access unit delimiters (AUDs) after bitstream extractions. A DPB is a buffer used to store reconstructed reference pictures used to predict current pictures in a coding process. The DPB can store up to a certain amount of pictures which can include reference pictures and, in some cases, a current picture. In some cases, the size of the DPB can be signaled via a syntax element that defines the maximum size of the DPB. In some examples, given the limited size of the DPB, a process called "bumping" can be used to remove or "bump" pictures from the DPB.

To indicate whether pictures in the DPB should be removed from the DPB or kept in the DPB for future use/reference, the pictures in the DPB can be marked (e.g., flagged, labeled, etc.). The picture markings can specify whether specific pictures in the DPB can be removed or kept in the DPB. In some examples, the picture marking can specify whether a picture is to be output, which can trigger the picture being bumped out of the DPB. A picture in the DPB can be marked for removal from the DPB if that picture is not needed for reference to predict a current picture. On the other hand, the picture can be marked to remain in the DPB if the picture is to be used as a reference picture to predict one or more other pictures. In some cases, a picture in the DPB can also be marked to remain in the DPB if the picture still needs to be output by the decoder and/or is not ready for display given a picture presentation order.

Additional bumping can also be implemented to remove pictures from the DPB in order to free up space in the DPB for other pictures. For example, if the DPB is full and a current picture needs to be stored in the DPB for decoding, the additional bumping can be used to remove one or more pictures in the DPB to store the current picture in the DPB. The additional bumping process can thus ensure that at least one picture in the DPB is removed to free up space in the DPB for one or more other pictures. However, video coding standards do not invoke or implement the additional bumping for every picture in an AU. Instead, video coding standards may invoke or implement the additional bumping after coding of the last picture in an AU. In many cases, the DPB may become full before the last picture in the AU is processed and/or stored in the DPB. Accordingly, the DPB will not be able to store any new current pictures and/or reference pictures, which can result in errors and/or failures in the coding process.

For example, VVC can implement multi-layer coding where the DPB is common or shared across different layers of pictures. An AU can include a set of pictures that belong to different layers and contain coded pictures associated with a same time for output from the DPB. Moreover, the additional bumping is only performed when the last picture or decoding unit (DU) of an AU is removed from the coded picture buffer (CPB). However, the DPB can become full before all layers in the AU are processed. Since the additional bumping process is performed when the last picture or DU of the AU is removed from the CPB, the additional bumping process will not prevent the DPB from becoming full before all pictures of the AU are processed. As a result, the DPB will not have space to store a current picture associated with any remaining layers in the AU. This can result in errors and/or failures in the coding of the AU.

The systems and techniques described herein allow the additional bumping process to be invoked after every picture or after the last DU of every picture of an AU. For example, the additional bumping can be invoked for an AU when the last DU of the current picture is removed from the CPB. In some examples, one or more pictures in the DPB can be marked for output/removal from the DPB after each current picture or the last DU of each picture is removed from the CPB. The marking of the one or more pictures can trigger the additional bumping to remove the one or more pictures from the DPB after each current picture or the last DU of each picture is removed from the CPB. This can ensure that the DPB has space each time it needs to store a picture of the AU, and can prevent the errors and failures mentioned above resulting from the DPB becoming full before the last picture is stored in the DPB for processing.

The systems and techniques described herein can be applied to any of the existing video codecs (e.g., High Efficiency Video Coding (HEVC), Advanced Video Coding (AVC), or other suitable existing video codec), and/or can be an efficient coding tool for any video coding standards being developed and/or future video coding standards, such as, for example, Versatile Video Coding (VVC), the joint exploration model (JEM), VP9, the AV1 format/codec, and/or other video coding standard in development or to be developed.

FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. As used herein, the term coding can refer to encoding and/or decoding. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard, format, codec, or protocol to generate an encoded video bitstream. Examples of video coding standards and formats/codecs include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, High Efficiency Video Coding (HEVC) or ITU-T H.265, and Versatile Video Coding (VVC) or ITU-T H.266. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). VP9, AOMedia Video 1 (AV1) developed by the Alliance for Open Media Alliance of Open Media (AOMedia), and Essential Video Coding (EVC) are other video coding standards for which the techniques described herein can be applied.

The techniques described herein can be applied to any of the existing video codecs (e.g., High Efficiency Video Coding (HEVC), Advanced Video Coding (AVC), or other suitable existing video codec), and/or can be an efficient coding tool for any video coding standards being developed and/or future video coding standards, such as, for example, VVC and/or other video coding standard in development or to be developed. For example, examples described herein can be performed using video codecs such as VVC, HEVC, AVC, and/or extensions thereof. However, the techniques and systems described herein may also be applicable to other coding standards, codecs, or formats, such as MPEG, JPEG (or other coding standard for still images), VP9, AV1, extensions thereof, or other suitable coding standards already available or not yet available or developed. For instance, in some examples, the encoding device 104 and/or the decoding device 112 may operate according to a proprietary video codec/format, such as AV1, extensions of AV1, and/or successor versions of AV1 (e.g., AV2), or other proprietary formats or industry standards. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that, in some cases, is part of a video. In some examples, data from the video source 102 can be a still image that is not a part of a video. In HEVC, VVC, and other video coding specifications, a video sequence can include a series of pictures. A picture may include three sample arrays, denoted SL, SCb, and SCr. SL is a two-dimensional array of luma samples, SCb is a two-dimensional array of Cb chrominance samples, and SCr is a two-dimensional array of Cr chrominance samples. Chrominance samples may also be referred to herein as "chroma" samples. A pixel can refer to all three components (luma and chroma samples) for a given location in an array of a picture. In other instances, a picture may be monochrome and may only include an array of luma samples, in which case the terms pixel and sample can be used interchangeably. With respect to example techniques described herein that refer to individual samples for illustrative purposes, the same techniques can be applied to pixels (e.g., all three sample components for a given location in an array of a picture). With respect to example techniques described herein that refer to pixels (e.g., all three sample components for a given location in an array of a picture) for illustrative purposes, the same techniques can be applied to individual samples.

The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. VCL NAL units include coded picture data forming a coded video bitstream. For example, a sequence of bits forming the coded video bitstream is present in VCL NAL units. A VCL NAL unit can include one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). In some cases, each slice or other portion of a bitstream can reference a single active PPS, SPS, and/or VPS to allow the decoding device 112 to access information that may be used for decoding the slice or other portion of the bitstream.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments.

In HEVC, the slices are then partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy (IBC) prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements. Transform coding is described in more detail below.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some implementations, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

The encoder engine 106 and decoder engine 116 (described in more detail below) may be configured to operate according to VVC. According to VVC, a video coder (such as encoder engine 106 and/or decoder engine 116) partitions a picture into a plurality of coding tree units (CTUs) (where a CTB of luma samples and one or more CTBs of chroma samples, along with syntax for the samples, are referred to as a CTU). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enables parallel processing and/or multi-threading for encoder and decoder implementations.

In some examples, the video coder can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The video coder can be configured to use quadtree partitioning, QTBT partitioning, MTT partitioning, superblock partitioning, or other partitioning structure.

In some examples, the one or more slices of a picture are assigned a slice type. Slice types include an intra-coded slice (I-slice), an inter-coded P-slice, and an inter-coded B-slice. An I-slice (intra-coded frames, independently decodable) is a slice of a picture that is only coded by intra-prediction, and therefore is independently decodable since the I-slice requires only the data within the frame to predict any prediction unit or prediction block of the slice. A P-slice (uni-directional predicted frames) is a slice of a picture that may be coded with intra-prediction and with uni-directional inter-prediction. Each prediction unit or prediction block within a P-slice is either coded with intra-prediction or inter-prediction. When the inter-prediction applies, the prediction unit or prediction block is only predicted by one reference picture, and therefore reference samples are only from one reference region of one frame. A B-slice (bi-directional predictive frames) is a slice of a picture that may be coded with intra-prediction and with inter-prediction (e.g., either bi-prediction or uni-prediction). A prediction unit or prediction block of a B-slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction of a picture utilizes the correlation between spatially neighboring samples within the picture. There is a plurality of intra-prediction modes (also referred to as "intra modes"). In some examples, the intra prediction of a luma block includes 35 modes, including the Planar mode, DC mode, and 33 angular modes (e.g., diagonal intra prediction modes and angular modes adjacent to the diagonal intra prediction modes). The 35 modes of the intra prediction are indexed as shown in Table 1 below. In other examples, more intra modes may be defined including prediction angles that may not already be represented by the 33 angular modes. In other examples, the prediction angles associated with the angular modes may be different from those used in HEVC.

TABLE 1

Specification of intra prediction mode and associated names

| Intra-prediction mode | Associated name |
|---|---|
| 0 | INTRA_PLANAR |
| 1 | INTRA_DC |
| 2..34 | INTRA_ANGULAR2..INTRA_ANGULAR34 |

Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction (also referred to as bi-directional inter-prediction), two sets of motion parameters ($\Delta x_0$, $y_0$, refIdx$_0$ and $\Delta x_1$, $y_1$, refIdx$_1$) are used to generate two motion compensated predictions (from the same reference picture or possibly from different reference pictures). For example, with bi-prediction, each prediction block uses two motion compensated prediction signals, and generates B prediction units. The two motion compensated predictions are then combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction (also referred to as uni-directional inter-prediction), one set of motion parameters ($\Delta x_0$, $y_0$, refIdx$_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, the video encoding device 104 encodes blocks of a current frame based on the difference between sample values in the current block and predicted values generated from reference samples in the same frame. The video encoding device 104 determines predicted values generated from the reference samples based on the intra prediction mode.

After performing prediction using intra- and/or inter-prediction, the encoding device 104 can perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), ultra-wideband (UWB), WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data. The storage 108 can also include a decoded picture buffer (DPB) for storing reference pictures for use in inter-prediction. In a further example, the storage 108 can correspond to a file server or another intermediate storage device that may store the encoded video generated by the source device. In such cases, the receiving device including the decoding device 112 can access stored video data from the storage device via streaming or download. The file server may be any type of server capable of storing encoded video data and transmitting that encoded video data to the receiving device. Example file servers include a web server (e.g., for a website), an FTP server, network attached storage (NAS) devices, or a local disk drive. The receiving device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage 108 may be a streaming transmission, a download transmission, or a combination thereof.

The input 114 of the decoding device 112 receives the encoded video bitstream data and may provide the video bitstream data to the decoder engine 116, or to storage 118 for later use by the decoder engine 116. For example, the storage 118 can include a DPB for storing reference pictures for use in inter-prediction. The receiving device including the decoding device 112 can receive the encoded video data to be decoded via the storage 108. The encoded video data may be modulated according to a communication standard, such as a wireless communication protocol, and transmitted to the receiving device. The communication medium for transmitting the encoded video data can comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the receiving device.

The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The video decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device.

The example system shown in FIG. 1 is one illustrative example that can be used herein. Techniques for processing video data using the techniques described herein can be performed by any digital video encoding and/or decoding device. Although generally the techniques of this disclosure are performed by a video encoding device or a video decoding device, the techniques may also be performed by a combined video encoder-decoder, typically referred to as a "CODEC." Moreover, the techniques of this disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers usually represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

As previously described, an HEVC bitstream includes a group of NAL units, including VCL NAL units and non- VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

This disclosure may generally refer to "signaling" certain information, such as syntax elements. The term "signaling" may generally refer to the communication of values for syntax elements and/or other data used to decode encoded video data. For example, the video encoding device 104 may signal values for syntax elements in the bitstream. In general, signaling refers to generating a value in the bitstream. As noted above, video source 102 may transport the bitstream to video destination device 122 substantially in real time, or not in real time, such as might occur when storing syntax elements to storage 108 for later retrieval by the video destination device 122.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can be use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

As described above, for each block, a set of motion information (also referred to herein as motion parameters) can be available. A set of motion information contains motion information for forward and backward prediction directions. The forward and backward prediction directions are two prediction directions of a bi-directional prediction mode, in which case the terms "forward" and "backward" do not necessarily have a geometrical meaning. Instead, "forward" and "backward" correspond to reference picture list 0 (RefPicList0 or L0) and reference picture list 1 (RefPicList1 or L1) of a current picture. In some examples, when only one reference picture list is available for a picture or slice, only RefPicList0 is available and the motion information of each block of a slice is always forward.

In some cases, a motion vector together with its reference index is used in coding processes (e.g., motion compensation). Such a motion vector with the associated reference index is denoted as a uni-predictive set of motion information. For each prediction direction, the motion information can contain a reference index and a motion vector. In some cases, for simplicity, a motion vector itself may be referred in a way that it is assumed that it has an associated reference index. A reference index is used to identify a reference picture in the current reference picture list (RefPicList0 or RefPicList1). A motion vector has a horizontal and a vertical component that provide an offset from the coordinate position in the current picture to the coordinates in the reference picture identified by the reference index. For example, a reference index can indicate a particular reference picture that should be used for a block in a current picture, and the motion vector can indicate where in the reference picture the best-matched block (the block that best matches the current block) is in the reference picture.

A picture order count (POC) can be used in video coding standards to identify a display order of a picture. Although there are cases for which two pictures within one coded video sequence may have the same POC value, it typically does not happen within a coded video sequence. When multiple coded video sequences are present in a bitstream, pictures with a same value of POC may be closer to each other in terms of decoding order. POC values of pictures can be used for reference picture list construction, derivation of reference picture set as in HEVC, and motion vector scaling.

In H.264/AVC, each inter macroblock (MB) may be partitioned in four different ways, including: one 16×16 MB partition; two 16×8 MB partitions; two 8×16 MB partitions; and four 8×8 MB partitions. Different MB partitions in one MB may have different reference index values for each direction (RefPicList0 or RefPicList1). In some cases, when an MB is not partitioned into four 8×8 MB partitions, it can have only one motion vector for each MB partition in each direction. In some cases, when an MB is partitioned into four 8×8 MB partitions, each 8×8 MB partition can be further partitioned into sub-blocks, in which case each sub-block can have a different motion vector in each direction. In some examples, there are four different ways to get sub-blocks from an 8×8 MB partition, including: one 8×8 sub-block; two 8×4 sub-blocks; two 4×8 sub-blocks; and four 4×4 sub-blocks. Each sub-block can have a different motion vector in each direction. Therefore, a motion vector is present in a level equal to higher than sub-block.

In AVC, a temporal direct mode can be enabled at either the MB level or the MB partition level for skip and/or direct mode in B slices. For each MB partition, the motion vectors of the block co-located with the current MB partition in the RefPicList1[0] of the current block are used to derive the motion vectors. Each motion vector in the co-located block is scaled based on POC distances.

A spatial direct mode can also be performed in AVC. For example, in AVC, a direct mode can also predict motion information from the spatial neighbors.

As noted above, in HEVC, the largest coding unit in a slice is called a coding tree block (CTB). A CTB contains a quad-tree, the nodes of which are coding units. The size of a CTB can range from 16×16 to 64×64 in the HEVC main profile. In some cases, 8×8 CTB sizes can be supported. A coding unit (CU) could be the same size of a CTB and as small as 8×8. In some cases, each coding unit is coded with one mode. When a CU is inter-coded, the CU may be further partitioned into 2 or 4 prediction units (PUs), or may become just one PU when further partition does not apply. When two PUs are present in one CU, they can be half size rectangles or two rectangles with ¼ or ¾ size of the CU.

When the CU is inter-coded, one set of motion information is present for each PU. In addition, each PU is coded with a unique inter-prediction mode to derive the set of motion information.

For motion prediction in HEVC for example, there are two inter-prediction modes, including merge mode and advanced motion vector prediction (AMVP) mode for a prediction unit (PU). Skip is considered as a special case of merge. In either AMVP or merge mode, a motion vector (MV) candidate list is maintained for multiple motion vector predictors. The motion vector(s), as well as reference indices in the merge mode, of the current PU are generated by taking one candidate from the MV candidate list. In some examples, one or more scaling window offsets can be included along with stored motion vectors in a MV candidate list.

In examples where a MV candidate list is used for motion prediction of a block, the MV candidate list may be constructed by the encoding device and the decoding device separately. For instance, the MV candidate list can be generated by an encoding device when encoding a block, and can be generated by a decoding device when decoding the block. Information related to motion information candidates in the MV candidate list (e.g., information related to one or more motion vectors, information related to one or more LIC flags which can be stored in the MV candidate list in some cases, and/or other information), can be signaled between the encoding device and the decoding device. For example, in the merge mode, index values to the stored motion information candidates can be signaled from an encoding device to a decoding device (e.g., in a syntax structure, such as the picture parameter set (PPS), sequence parameter set (SPS), video parameter set (VPS), a slice header, a supplemental enhancement information (SEI) message sent in or separately from the video bitstream, and/or other signaling). The decoding device can construct a MV candidate list and use the signaled references or indexes to obtain one or more motion information candidates from the constructed MV candidate list to use for motion compensation prediction. For example, the decoding device 112 may construct a MV candidate list and use a motion vector (and in some cases an LIC flag) from an indexed location for motion prediction of the block. In the case of AMVP mode, in addition to the references or indexes, differences or residual values may also be signaled as deltas. For example, for the AMVP mode, the decoding device can construct one or more MV candidate lists and apply the delta values to one or more motion information candidates obtained using the signaled index values in performing motion compensation prediction of the block.

In some examples, the MV candidate list contains up to five candidates for the merge mode and two candidates for the AMVP mode. In other examples, different numbers of candidates can be included in a MV candidate list for merge mode and/or AMVP mode. A merge candidate may contain a set of motion information. For example, a set of motion information can include motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode, for each potential prediction direction from either list 0 or list 1, a reference index needs to be explicitly signaled, together with an MVP index to the MV candidate list since the AMVP candidate contains only a motion vector. In AMVP mode, the predicted motion vectors can be further refined.

As can be seen above, a merge candidate corresponds to a full set of motion information, while an AMVP candidate contains just one motion vector for a specific prediction direction and reference index. The candidates for both modes are derived similarly from the same spatial and temporal neighboring blocks.

In some examples, merge mode allows an inter-predicted PU to inherit the same motion vector or vectors, prediction direction, and reference picture index or indices from an inter-predicted PU that includes a motion data position selected from a group of spatially neighboring motion data positions and one of two temporally co-located motion data positions. For AMVP mode, motion vector or vectors of a PU can be predicatively coded relative to one or more motion vector predictors (MVPs) from an AMVP candidate list constructed by an encoder and/or a decoder. In some instances, for single direction inter-prediction of a PU, the encoder and/or decoder can generate a single AMVP candidate list. In some instances, for bi-directional prediction of a PU, the encoder and/or decoder can generate two AMVP candidate lists, one using motion data of spatial and temporal neighboring PUs from the forward prediction direction and one using motion data of spatial and temporal neighboring PUs from the backward prediction direction.

Figure 2A:
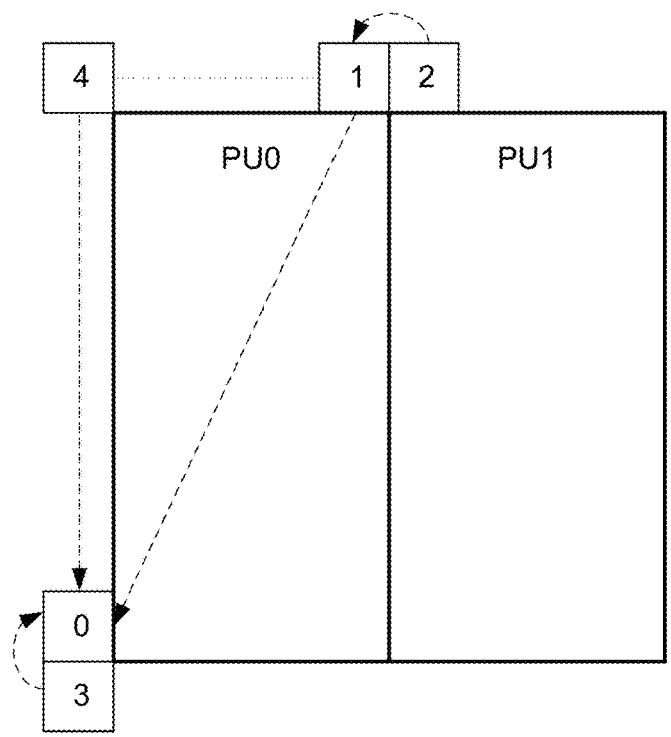
FIG. 2A is a conceptual diagram illustrating example spatial neighboring motion vector candidates for a merge mode, in accordance with some examples of the disclosure.
Figure 2B:
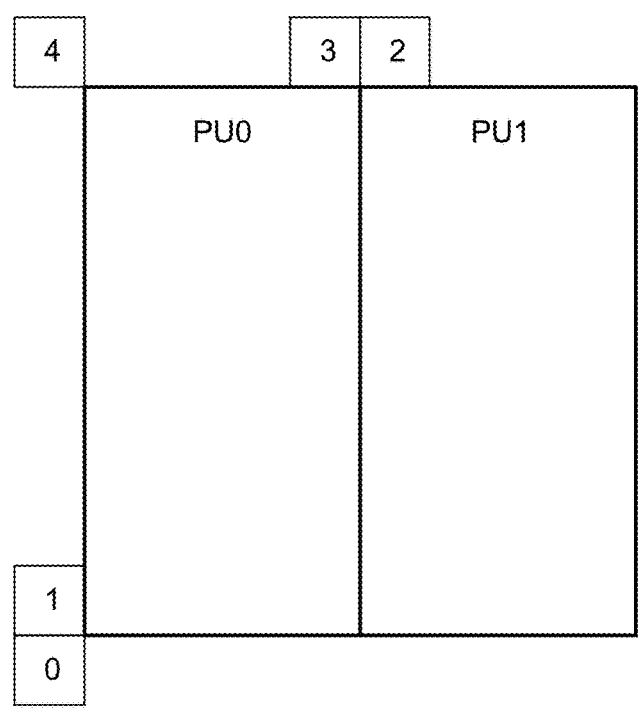
FIG. 2B is a conceptual diagram illustrating example spatial neighboring motion vector candidates for an advanced motion vector prediction (AMVP) mode, in accordance with some examples of the disclosure.

The candidates for both modes can be derived from spatial and/or temporal neighboring blocks. For example, FIG. 2A and FIG. 2B include conceptual diagrams illustrating spatial neighboring candidates. FIG. 2A illustrates spatial neighboring motion vector (MV) candidates for merge mode. FIG. 2B illustrates spatial neighboring motion vector (MV) candidates for AMVP mode. Spatial MV candidates are derived from the neighboring blocks for a specific PU (PU0), although the methods generating the candidates from the blocks differ for merge and AMVP modes.

In merge mode, the encoder and/or decoder can form a merging candidate list by considering merging candidates from various motion data positions. For example, as shown in FIG. 2A, up to four spatial MV candidates can be derived with respect to spatially neighboring motion data positions shown with numbers 0-4 in FIG. 2A. The MV candidates can be ordered in the merging candidate list in the order shown by the numbers 0-4. For example, the positions and order can include: left position (0), above position (1), above right position (2), below left position (3), and above left position (4).

In AVMP mode shown in FIG. 2B, the neighboring blocks are divided into two groups: left group including the blocks 0 and 1, and above group including the blocks 2, 3, and 4. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate will be scaled to form the final candidate, thus the temporal distance differences can be compensated.

Figure 3A:
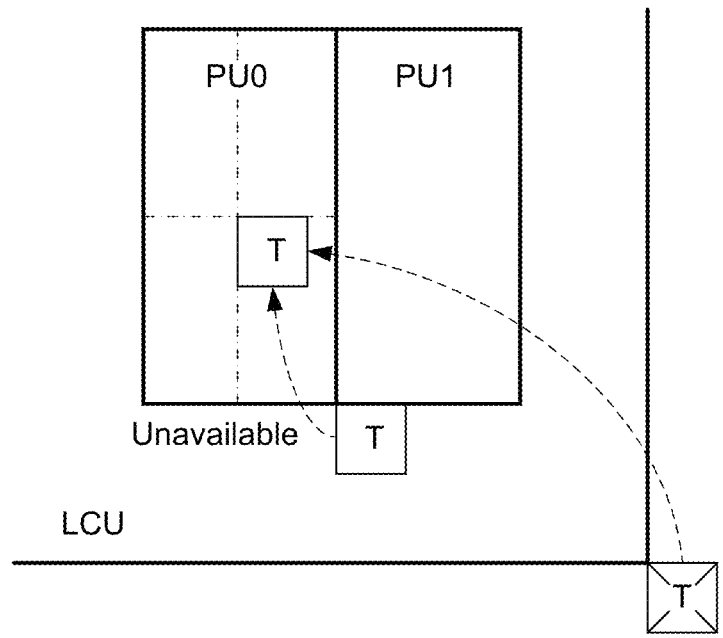
FIG. 3A is a conceptual diagram illustrating an example temporal motion vector predictor (TMVP) candidate, in accordance with some examples of the disclosure.
Figure 3B:
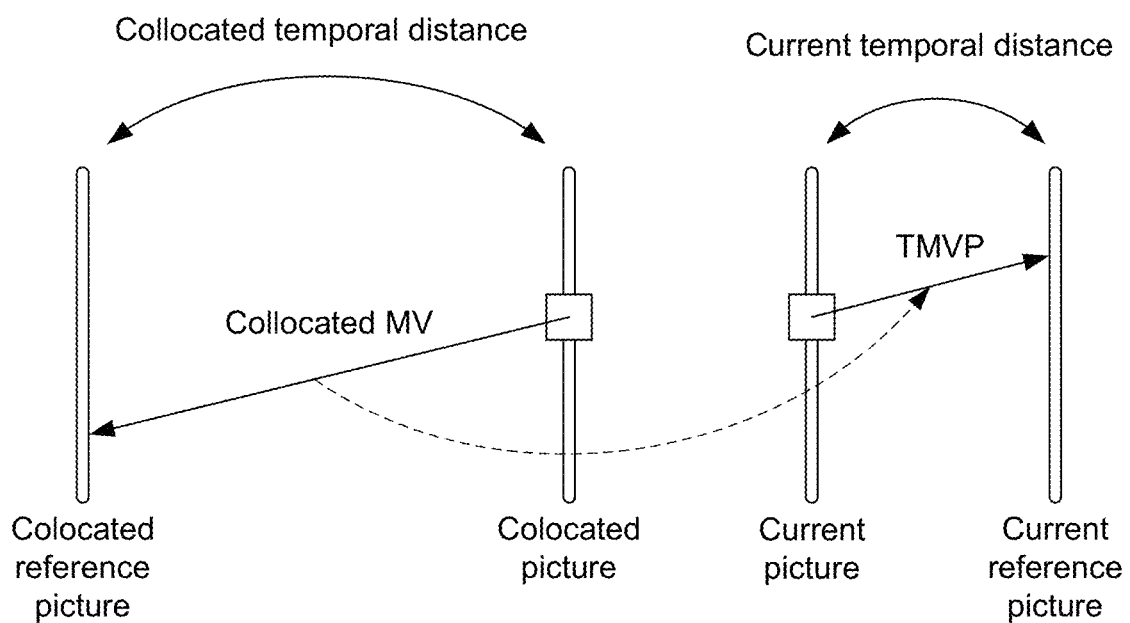
FIG. 3B is a conceptual diagram illustrating an example of motion vector scaling, in accordance with some examples of the disclosure.

FIG. 3A and FIG. 3B include conceptual diagrams illustrating temporal motion vector prediction. A temporal motion vector predictor (TMVP) candidate, if enabled and available, is added to a MV candidate list after spatial motion vector candidates. The process of motion vector derivation for a TMVP candidate is the same for both merge and AMVP modes. In some instances, however, the target reference index for the TMVP candidate in the merge mode can be set to zero or can be derived from that of the neighboring blocks.

The primary block location for TMVP candidate derivation is the bottom right block outside of the collocated PU, as shown in FIG. 3A as a block "T", to compensate for the bias to the above and left blocks used to generate spatial neighboring candidates. However, if that block is located outside of the current CTB (or LCU) row or motion information is not available, the block is substituted with a center block of the PU. A motion vector for a TMVP candidate is derived from the co-located PU of the co-located picture, indicated in the slice level. Similar to temporal direct mode in AVC, a motion vector of the TMVP candidate may be subject to motion vector scaling, which is performed to compensate for distance differences.

Other aspects of motion prediction are covered in the HEVC standard and/or other standard, format, or codec. For example, several other aspects of merge and AMVP modes are covered. One aspect includes motion vector scaling. With respect to motion vector scaling, it can be assumed that the value of motion vectors is proportional to the distance of pictures in the presentation time. A motion vector associates two pictures—the reference picture and the picture containing the motion vector (namely the containing picture). When a motion vector is utilized to predict the other motion vector, the distance of the containing picture and the reference picture is calculated based on the Picture Order Count (POC) values.

For a motion vector to be predicted, both its associated containing picture and reference picture may be different. Therefore, a new distance (based on POC) is calculated. And, the motion vector is scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Another aspect of motion prediction includes artificial motion vector candidate generation. For example, if a motion vector candidate list is not complete, artificial motion vector candidates are generated and inserted at the end of the list until all candidates are obtained. In merge mode, there are two types of artificial MV candidates: combined candidate derived only for B-slices; and zero candidates used only for AMVP if the first type does not provide enough artificial candidates. For each pair of candidates that are already in the candidate list and that have necessary motion information, bi-directional combined motion vector candidates are derived by a combination of the motion vector of the first candidate referring to a picture in the list 0 and the motion vector of a second candidate referring to a picture in the list 1.

In some implementations, a pruning process can be performed when adding or inserting new candidates into an MV candidate list. For example, in some cases it is possible for MV candidates from different blocks to include the same information. In such cases, storing duplicative motion information of multiple MV candidates in the MV candidate list can lead to redundancy and a decrease in the efficiency of the MV candidate list. In some examples, the pruning process can eliminate or minimize redundancies in the MV candidate list. For example, the pruning process can include comparing a potential MV candidate to be added to an MV candidate list against the MV candidates which are already stored in the MV candidate list. In one illustrative example, the horizontal displacement ($\Delta x$) and the vertical displacement ($\Delta y$) (indicating a position of a reference block relative to a position of the current block) of a stored motion vector can be compared to the horizontal displacement ($\Delta x$) and the vertical displacement ($\Delta y$) of the motion vector of a potential candidate. If the comparison reveals that the motion vector of the potential candidate does not match any of the one or more stored motion vectors, the potential candidate is not considered as a candidate to be pruned and can be added to the MV candidate list. If a match is found based on this comparison, the potential MV candidate is not added to the MV candidate list, avoiding the insertion of an identical candidate. In some cases, to reduce complexity, only a limited number of comparisons are performed during the pruning process instead of comparing each potential MV candidate with all existing candidates.

In certain coding schemes such as HEVC, Weighted Prediction (WP) is supported, in which case a scaling factor (denoted by a), a shift number (denoted by s) and an offset (denoted by b) is used in the motion compensation. Suppose the pixel value in position (x, y) of the reference picture is p(x, y), then p'(x, y)=((a*p(x, y)+(1<<(s−1)))>>s)+b instead of p(x, y) is used as the prediction value in motion compensation.

When WP is enabled, for each reference picture of current slice, a flag is signaled to indicate whether WP applies for the reference picture or not. If WP applies for one reference picture, a set of WP parameters (i.e., a, s and b) is sent to the decoder and is used for motion compensation from the reference picture. In some examples, to flexibly turn on/off WP for luma and chroma component, WP flag and WP parameters are separately signaled for luma and chroma component. In WP, one same set of WP parameters is used for all pixels in one reference picture.

Figure 4A:
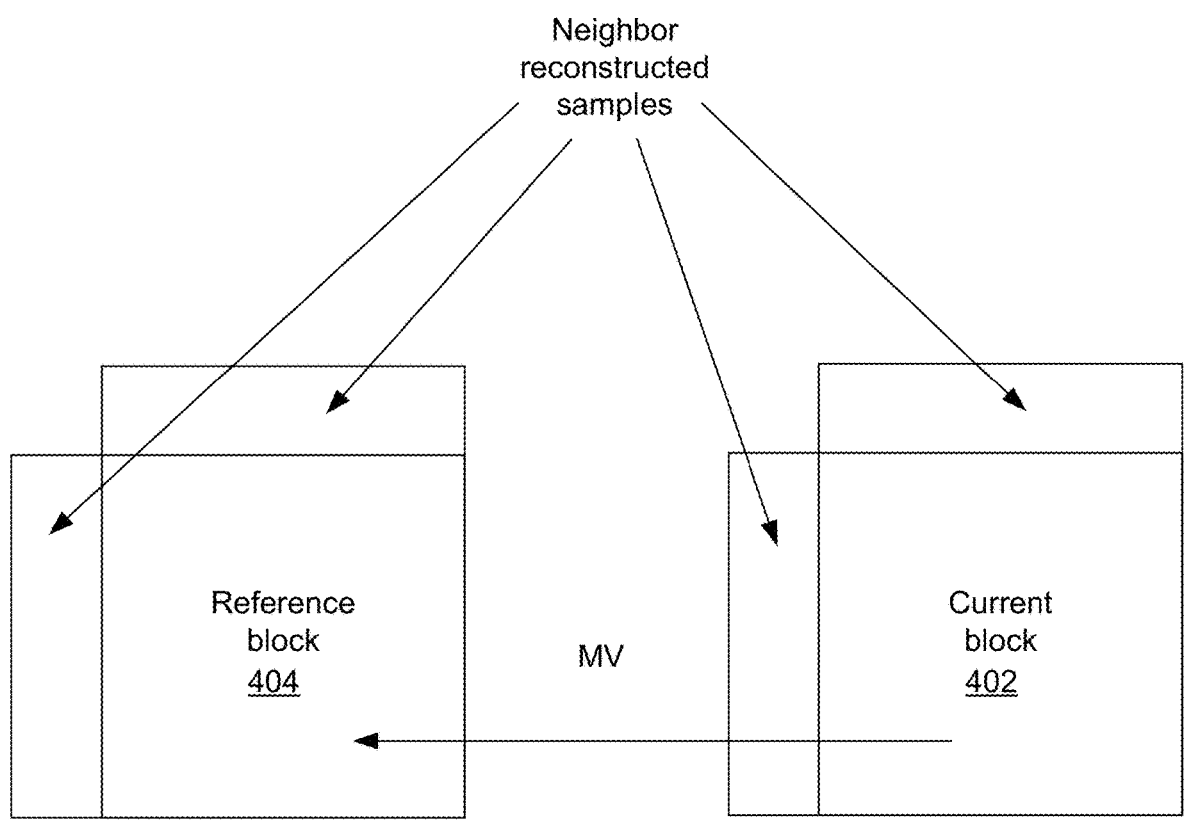
FIG. 4A is a conceptual diagram illustrating an example of neighboring samples of a current coding unit used for estimating motion compensation parameters for the current coding unit, in accordance with some examples of the disclosure.
Figure 4B:
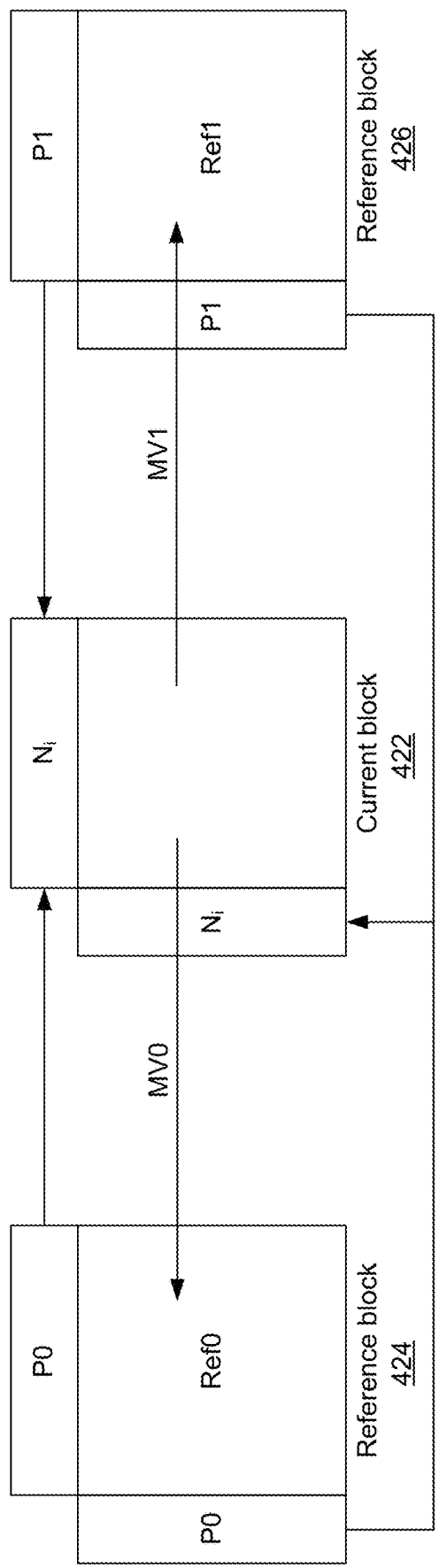
FIG. 4B is a conceptual diagram illustrating an example of neighboring samples of a reference block used for estimating motion compensation parameters for a current coding unit, in accordance with some examples of the disclosure.

FIG. 4A is a diagram illustrating an example of neighbor reconstructed samples of a current block 402 and neighbor samples of a reference block 404 used for uni-directional inter-prediction. A motion vector MV can be coded for the current block 402, where the MV can include a reference index to a reference picture list and/or other motion information for identifying the reference block 404. For example, the MV can include a horizontal and a vertical component that provides an offset from the coordinate position in the current picture to the coordinates in the reference picture identified by the reference index. FIG. 4B is a diagram illustrating an example of neighbor reconstructed samples of a current block 422 and neighbor samples of a first reference block 424 and a second reference block 426 used for bi-directional inter-prediction. In this case, two motion vectors MV0 and MV1 can be coded for the current block 422 to identify the first reference block 424 and a second reference block 426, respectively.

As previously noted, in some aspects, systems and techniques are provided for DPB operations and rewriting AUDs after bitstream extractions. Certain video coding standards, such as VVC, can implement multi-layer coding where the DPB is common or shared across different layers. The number of layers can be signaled in a syntax element. For example, in VVC, the number of layers can be signaled in a VPS as follows:

TABLE 2

Signaling the number of layers

| | Descriptor |
|---|---|
| video_parameter_set_rbsp( ) { | |
|   vps_video_parameter_set_id | u (4) |
|   vps_max_layers_minus1 | u (6) |
|   ... | |

In Table 2, vps_max_layers_minus1 specifies the number of layers specified by the VPS, which is the maximum number of layers in each coded video sequence (CVS) referring to the VPS. In some examples, the DPB operations can include a bumping process for output and removal of pictures from the DPB before decoding of a current picture is invoked, an invocation of a process for marking and storing a current decoded picture, and an invocation of an additional bumping as described herein.

The current decoded picture can be stored in the DPB in an empty picture storage buffer. The DPB fullness can be incremented by one, and the current picture can be marked as "used for short-term reference". Unless more memory than needed by the level limit is available for storage of decoded pictures, decoders can start storing decoded parts of the current picture into the DPB when the first slice is decoded and continue storing more decoded samples as the decoding process proceeds.

To avoid the DPB becoming full before the last picture in an AU has been stored in the DPB for processing, the systems and techniques described herein can invoke an additional bumping process after every picture or after the last decoding unit (DU) of every picture of an AU, which can include marking one or more pictures in the DPB for output/removal and removing such one or more pictures from the DPB. The one or more pictures can include a picture(s) from any of the layers associated with the AU.

In some examples, the additional bumping process can be invoked for an AU when the last DU of the AU containing the current picture is removed from the CPB. In some examples, the AU can be removed from the condition when the additional bumping process is applied. For example, the AU can be removed from the condition to apply the additional bumping process once the additional bumping process has been applied for the AU. In one illustrative example, removal of the AU from the condition can be reflected in Section C.5.2.3 of the VVC Standard as follows (with deleted language being shown in stricken-through text— e.g., ~~stricken through text~~):

C.5.2.3 Additional Bumping

The processes specified in this clause happen instantaneously when the last DU of ~~AU n containing~~ the current picture is removed from the CPB.

In some cases, an input bitstream or sub-bitstream may include one or more AUs that are not Intra Random Access Point (IRAP) AUs (e.g., non-IRAP AUs) or gradual decoder refresh (GDR) AUs (e.g., non-GDR AUs) that contain IRAP pictures or GDR pictures. In such cases, an extracted AU in an output bitstream or sub-bitstream may become an IRAP or GDR AU. In some cases, AU writing can be added to the extraction process for AUs that become IRAP AUs or GDR AUs, or AUs can be placed in all AUs that contain IRAP or GDR pictures and a rewriting of an aud_irap_or_gdr_au_flag can be added to the extraction process.

An AU delimeter (AUD) rewriting process can be implemented for an AU that contains IRAP or GDR pictures in any output layer set (OLS) for a sub-bitstream extraction process. Moreover, as further described herein, in cases where an AUD associated with an AU contains a single picture, the value of an aud_irap_or_gdr_au_flag in the associated AUD (if present) can also be rewritten. In some aspects, the systems and techniques described herein can provide a process for rewriting an AUD after an extraction of a sub-bitstream. An AUD can be used to indicate the start of an AU, whether the AU is an IRAP or a GDR AU, and/or the type of slices present in the coded pictures in the AU containing the AU delimiter NAL unit. In some cases, a constraint can be implemented providing that there be no AUD NAL unit in an AU when certain conditions are met. AUD NALs may be added to bitstreams such as, for example, type I and/or type II bitstreams.

In some examples, the certain conditions noted above can include a condition that the AU contain more than one coded picture, and/or a condition that only one coded picture in the AU is an IRAP picture or a GDR picture with the associated ph_recoverypoc_cnt not being equal to 0. In some examples, the ph_recoverypoc_cnt_syntax element specifies the recovery point of decoded pictures in an output order. In some cases, after the POC, pictures can be considered clean and can be displayed. In some examples, the recovery point includes a point in the bitstream at which the recovery of an exact or an approximate representation of decoded pictures represented by the bitstream is achieved after a random access or broken link. In some examples, a recovery point supplemental enhancement information (SEI) message be sent (e.g., by an encoder, such as the encoding device 104) to a decoder (e.g., the decoding device 112) and can assist the decoder in determining when the decoding process will produce acceptable pictures (e.g., pictures having a certain quality and/or other characteristic, etc.) for display after the decoder initiates random access or after the encoder indicates a broken link in the coded video sequence (CVS). When the decoding process is started with the access unit in a decoding order associated with the recovery point SEI message, the decoded pictures at or subsequent to the recovery point in the output order specified in the SEI message are indicated to be correct or approximately correct in content. In some cases, decoded pictures produced by random access at or before the picture associated with the recovery point SEI message need not be correct in content until the indicated recovery point, and the operation of the decoding process starting at the picture associated with the recovery point SEI message may contain references to pictures unavailable in the decoded picture buffer.

In some cases, an AU in an input bitstream may contain one IRAP picture or GDR picture with the associated ph_recoverypoc_cnt not equal to 0 and other VCL NAL unit types. Moreover, the AU may have an associated AUD with an aud_irap_or_gdr_au_flag equal to 0. After a bitstream extraction (or sub-bitstream extraction), an AU in the output bitstream may contain only one IRAP or GDR picture with the associated ph_recovery_poc_cnt not being equal to 0. Thus, the aud_irap_or_gdr_au_flag of the associated AUD can be set to 1 so the associated AUD is not dropped. An example implementation of such a solution is described with respect to the process 600 illustrated in FIG. 6.

In some examples, when an AU contains only VCL-NAL units with nal_unit_type equal to a single type of IDR_NUT, CRA_NUT or GDR_NUT and associated with an AUD, an aud_irap_or_gdr_au_flag of the associated AUD can be set to 1. In some cases, if an AU contains only one coded picture, the associated AUD (when present) can be removed or set to 1. Such rewriting of the AUD can be done for a single layer and/or multiple layers. Moreover, if, after a bitstream extraction (or sub-bitstream extraction) is performed there is a single layer present, the AUD flag is set to 1 or removed to avoid an incorrect AUD having a flag set to 0.

FIG. 5 is a flowchart illustrating an example process 500 for DPB operations. At block 502, the process 500 can include storing one or more pictures associated with an access unit (AU) in a decoded picture buffer (DPB). In some examples, the AU can include a first plurality of pictures, and the first plurality of pictures can correspond to a plurality of video coding layers. In some examples, the DPB has a size limit that is signaled via a syntax element that defines the size limit of the DPB. In some cases, the size limit is less than at least a portion of the first plurality of pictures associated with the AU. In some cases, one or more pictures stored in the DPB can include a reference picture and/or a decoded picture. For example, the DPB can include a reference picture(s) and/or a picture that was previously decoded.

At block 504, the process 500 can include, after each picture of a second plurality of pictures is removed from a coded picture buffer (CPB), removing at least one picture of the one or more pictures associated with the AU from the DPB. In some examples, the at least one picture of the one or more pictures can be removed from the DPB to free up space in the DPB for each picture of the second plurality of pictures, a reference picture(s) for decoding a current picture, and/or one or more additional pictures. In some cases, the at least one picture of the one or more pictures is removed from the DPB to prevent the DPB from filling up before a current picture and/or one or more associated reference pictures is/are stored in the DPB.

In some examples, the at least one picture of the one or more pictures is removed from the DPB and each picture of the second plurality of pictures is stored in the DPB prior to an amount of used storage of the DPB reaching a size limit of the DPB.

In some examples, the at least one picture of the one or more pictures removed from the DPB can include different pictures from a same layer of the plurality of video coding layers. In other examples, the at least one picture of the one or more pictures removed from the DPB can include different pictures from different layers of the plurality of video coding layers. In some cases, each video coding layer from the plurality of video coding layers is associated with a same output time from the DPB.

At block 506, the process 500 can include storing, in the DPB, each picture of the second plurality of pictures removed from the CPB. In some cases, the process 500 can include decoding pictures in the CPB. In some examples, the process 500 can include outputting decoded pictures from the DPB for display and/or storage. In some examples, the process 500 can include outputting one or more pictures in the DPB for display at a display device.

In some aspects, the process 500 can include removing the at least one picture of the one or more pictures from the DPB after a last decoding unit (DU) of each picture is removed from the CPB.

In some aspects, the process 500 can include marking the at least one picture of the one or more pictures in the DPB for removal from the DPB; and based on the marking of the at least one picture of the one or more pictures in the DPB, removing the at least one picture of the one or more pictures from the DPB. In some aspects, the process 500 can include setting a respective flag associated with the at least one picture of the one or more pictures. In some cases, the respective flag can indicate that the at least one picture of the one or more pictures is set for output from the DPB.

In some aspects, the process 500 can include extracting a second AU from at least a portion of a bitstream. The portion of the bitstream can include an entire bitstream or a sub-bitstream. In some aspects, the process 500 can include determining that the second AU includes only one or more intra random access point (TRAP) pictures or only one or more gradual decoder refresh (GDR) pictures; and based on the determining that the second AU includes only one or more TRAP pictures or only one or more GDR pictures, set a value of a flag (e.g., aud_irap_or_gdr_au_flag) of an AU delimiter (AUD) associated with the second AU to 1. In some examples, the value of the flag when set to 1 indicates that the second AU contains only one or more TRAP pictures or only one or more GDR pictures. For example, the value of the flag set to 1 can indicate that the second AU only contains an IRAP picture or only a GDR picture (and no other type of picture(s)).

In some cases, the flag can include an AUD IRAP or GDR flag (e.g., aud_irap_or_gdr_au_flag). In some examples, the second AU can include a single video coding layer and/or a single coded picture, and the single video coding layer and/or the single coded picture can include only the one or more TRAP pictures or only the one or more GDR pictures.

In some aspects, setting the value of the flag of the AUD to 1 can include changing the value of the flag from 0 to 1 based on a determination that, after the extracting of the second AU, the second AU is (or has become) an IRAP AU or a GDR AU.

Figure 6:
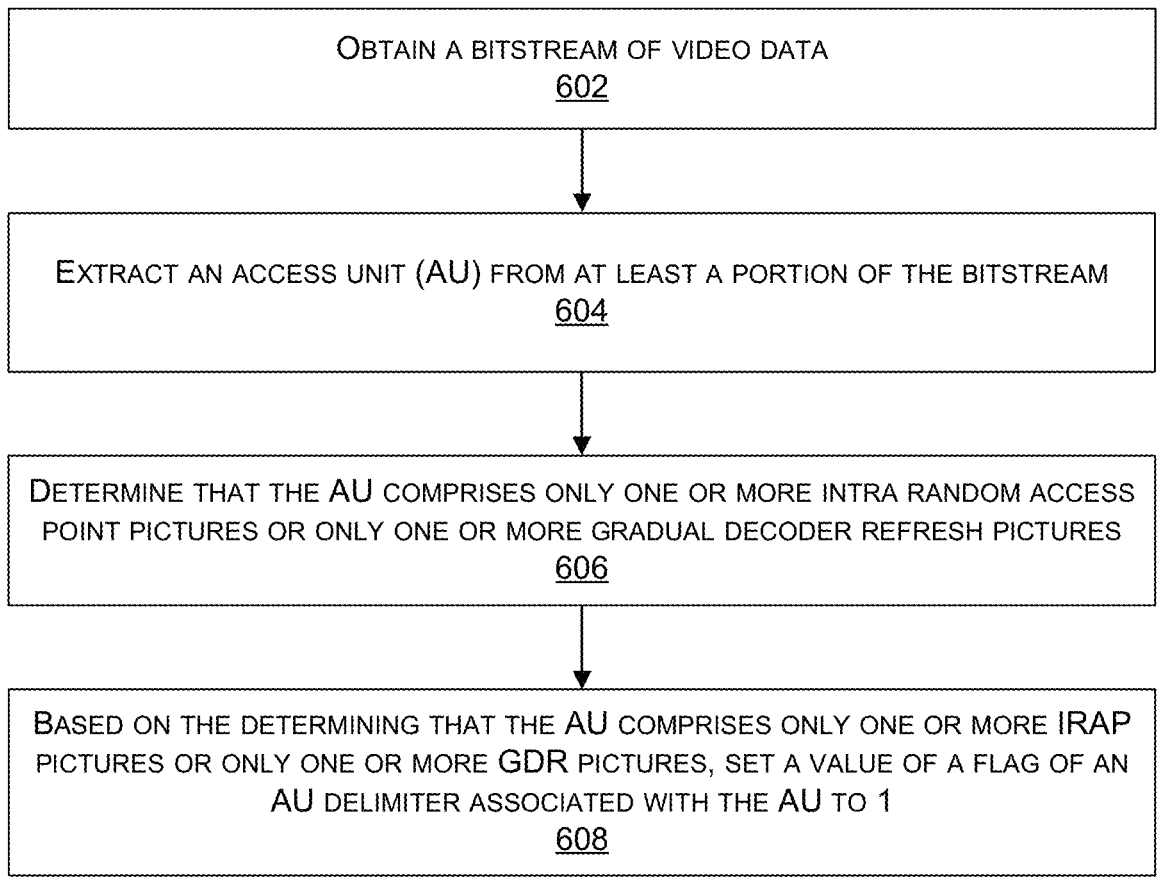
FIG. 6 is a flowchart illustrating an example process for rewriting access unit delimiters after bitstream extractions, in accordance with some examples of the disclosure.

FIG. 6 is a flowchart illustrating an example process 600 for rewriting AUDs after bitstream extractions. At block 602, the process 600 can include obtaining a bitstream of video data. In some examples, the bitstream can include an entire bitstream extracted from a received bitstream or a sub-bitstream extracted from a received bitstream.

At block 604, the process 600 can include extracting an access unit (AU) from at least a portion of the bitstream. At block 606, the process 600 can include determining that the AU only includes one or more intra random access point (TRAP) pictures or one or more gradual decoder refresh (GDR) pictures. For example, the process 600 can include determining that the AU only includes an TRAP picture(s) or a GDR picture(s) and no other type of picture(s).

At block 608, the process 600 can include, based on the determining that the AU only includes one or more TRAP pictures or one or more GDR pictures, setting a value of a flag of an AU delimiter (AUD) associated with the AU to 1.

In some examples, the flag having the value set to 1 indicates that the AU only contains one or more IRAP pictures or one or more GDR pictures.

In some examples, the flag can include an AUD TRAP or GDR flag (e.g., aud_irap_or_gdr_au_flag).

In some cases, the AU can include a single video coding layer and/or a single coded picture. In some examples, the single video coding layer and/or the single coded picture can include only the one or more TRAP pictures or only the one or more GDR pictures.

In some aspects, the process 600 can include determining that, after the extracting of the AU, the AU is an TRAP AU or a GDR AU. In some examples, setting the value of the flag of the AUD to 1 can include changing the value of the flag from 0 to 1 based on the determining that, after the extracting of the AU, the AU is an IRAP AU or a GDR AU.

In some implementations, the processes (or methods) described herein (including process 500 and process 600) can be performed by a computing device or an apparatus, such as the system 100 shown in FIG. 1. For example, the processes can be performed by the encoding device 104 shown in FIG. 1 and FIG. 7, by another video source-side device or video transmission device, by the decoding device 112 shown in FIG. 1 and FIG. 8, and/or by another client-side device, such as a player device, a display, or any other client-side device. In some cases, the computing device or apparatus may include one or more input devices, one or more output devices, one or more processors, one or more microprocessors, one or more microcomputers, and/or other component(s) that is/are configured to carry out the steps of process 500 and/or process 600.

In some examples, the computing device may include a mobile device, a desktop computer, a server computer and/or server system, or other type of computing device. The components of the computing device (e.g., the one or more input devices, one or more output devices, one or more processors, one or more microprocessors, one or more microcomputers, and/or other component) can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. In some examples, the computing device or apparatus may include a camera configured to capture video data (e.g., a video sequence) including video frames. In some examples, a camera or other capture device that captures the video data is separate from the computing device, in which case the computing device receives or obtains the captured video data. The computing device may include a network interface configured to communicate the video data. The network interface may be configured to communicate Internet Protocol (IP) based data or other type of data. In some examples, the computing device or apparatus may include a display for displaying output video content, such as samples of pictures of a video bitstream.

The processes can be described with respect to logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the application have been described.

Figure 7:
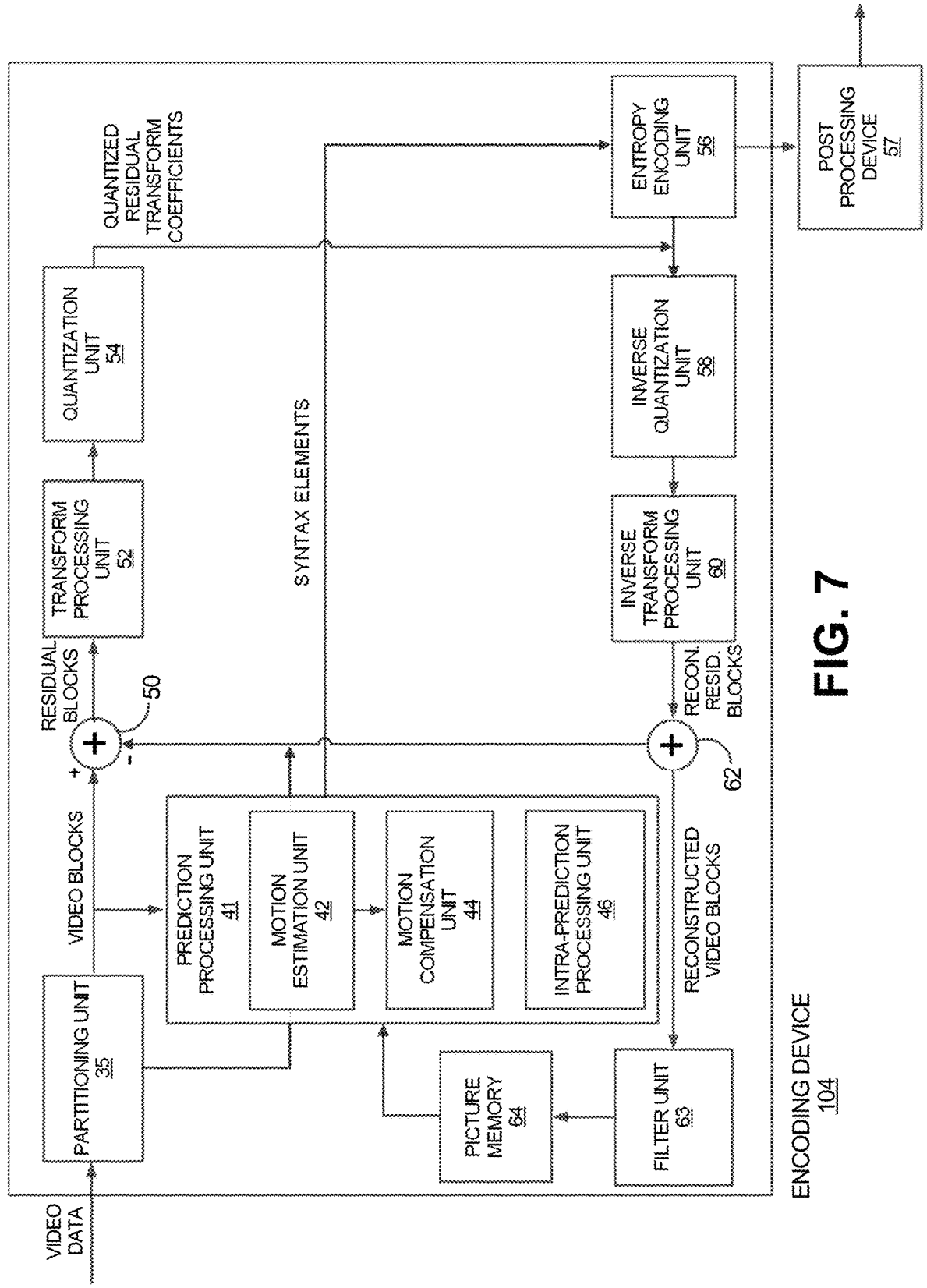
FIG. 7 is a block diagram illustrating an example video encoding device, in accordance with some examples of the disclosure.
Figure 8:
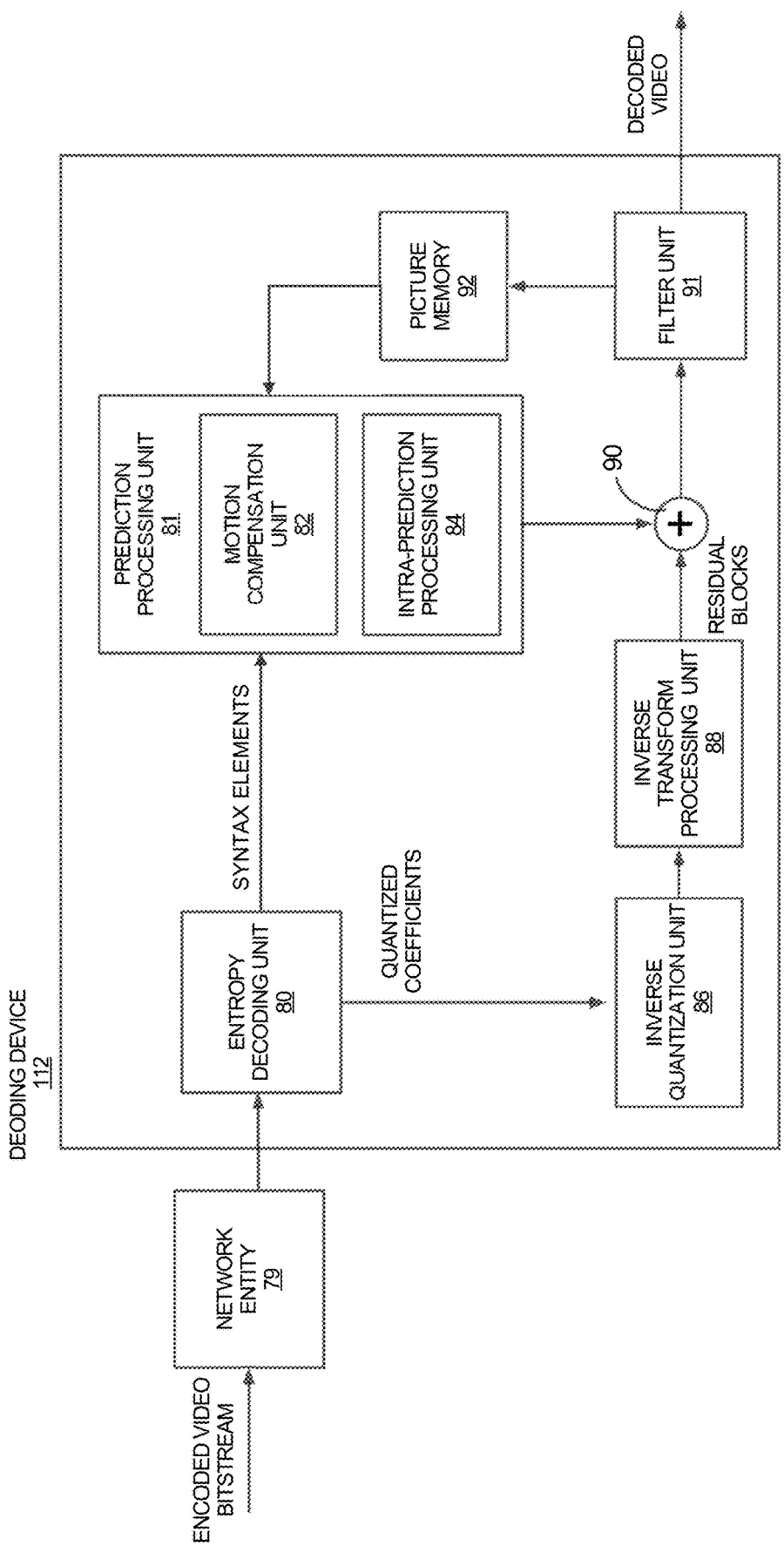
FIG. 8 is a block diagram illustrating an example video decoding device, in accordance with some examples of the disclosure.

Specific details of the encoding device 104 and the decoding device 112 are shown in FIG. 7 and FIG. 8, respectively. FIG. 7 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 7 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 7, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 7 represents an example of a video encoder configured to perform any of the techniques described herein, including the process described above with respect to FIG. 5 and the process described above with respect to FIG. 6. In some cases, some of the techniques of this disclosure may also be implemented by post processing device 57.

FIG. 8 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 7.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 8 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In this manner, the decoding device 112 of FIG. 8 represents an example of a video decoder configured to perform any of the techniques described herein, including the process described above with respect to FIG. 5 and the process described above with respect to FIG. 6.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to (" ") and greater than or equal to (" ") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative examples of the disclosure include:

Aspect 1. An apparatus comprising: memory and one or more processors coupled to the memory, the one or more processors being configured to: store one or more pictures associated with an access unit in a decoded picture buffer, the AU comprising a first plurality of pictures, the first plurality of pictures corresponding to a plurality of video coding layers; after each picture of a second plurality of pictures associated with the AU is removed from a coded picture buffer, remove at least one picture of the one or more pictures associated with the AU from the DPB; and store, in the DPB, each picture of the second plurality of pictures removed from the CPB.

Aspect 2. The apparatus of Aspect 1, wherein the one or more processors are configured to remove the at least one picture of the one or more pictures from the DPB after a last decoding unit of each picture of the second plurality of pictures is removed from the CPB.

Aspect 3. The apparatus of any of Aspects 1 to 2, wherein the one or more processors are configured to: mark the at least one picture of the one or more pictures in the DPB for removal from the DPB; and based on the marking of the at least one picture of the one or more pictures in the DPB, remove the at least one picture of the one or more pictures from the DPB.

Aspect 4. The apparatus of any of Aspects 1 to 3, wherein the one or more processors are further configured to set a respective flag associated with the at least one picture of the one or more pictures, the respective flag indicating that the at least one picture of the one or more pictures is set for output from the DPB.

Aspect 5. The apparatus of any of Aspects 1 to 4, wherein the DPB has a size limit that is signaled via a syntax element that defines the size limit of the DPB.

Aspect 6. The apparatus of Aspect 5, wherein the size limit is less than at least a portion of the first plurality of pictures associated with the AU.

Aspect 7. The apparatus of any of Aspects 1 to 6, wherein the at least one picture of the one or more pictures is removed from the DPB and each picture of the second plurality of pictures is stored in the DPB prior to an amount of used storage of the DPB reaching a size limit of the DPB.

Aspect 8. The apparatus of any of Aspects 1 to 7, wherein the one or more pictures stored in the DPB comprise at least one of a reference picture and a decoded picture.

Aspect 9. The apparatus of any of Aspects 1 to 8, wherein the at least one picture of the one or more pictures removed from the DPB comprises different pictures from a same layer of the plurality of video coding layers.

Aspect 10. The apparatus of any of Aspects 1 to 8, wherein the at least one picture of the one or more pictures removed from the DPB comprises different pictures from different layers of the plurality of video coding layers.

Aspect 11. The apparatus of any of Aspects 1 to 10, wherein each video coding layer among the plurality of video coding layers is associated with a same output time from the DPB.

Aspect 12. The apparatus of any of Aspects 1 to 11, wherein the apparatus includes a decoder.

Aspect 13. The apparatus of any of Aspects 1 to 12, further comprising a display configured to display one or more output pictures from the DPB.

Aspect 14. The apparatus of any of Aspects 1 to 13, wherein the apparatus includes an encoder.

Aspect 15. The apparatus of any of Aspects 1 to 14, further comprising a camera configured to capture pictures associated with the AU.

Aspect 16. The apparatus of any of Aspects 1 to 15, wherein the apparatus is a mobile device.

Aspect 17. The apparatus of any of Aspects 1 to 16, wherein the one or more processors are configured to: extract a second AU from at least a portion of a bitstream; determine that the second AU comprises only one or more intra random access point (IRAP) pictures or only one or more gradual decoder refresh (GDR) picturse; and based on the determining that the second AU comprises only one or more IRAP pictures or only one or more GDR pictures, set a value of a flag of an AU delimiter associated with the second AU to 1, wherein the value of the flag when set to 1 indicates that the second AU contains only one or more IRAP pictures or only one or more GDR pictures.

Aspect 18. The apparatus of Aspect 17, wherein the flag comprises an AUD IRAP or GDR flag, and wherein the second AU comprises at least one of a single video coding layer and a single coded picture, the at least one of the single video coding layer and the single coded picture comprising only the one or more TRAP pictures or only the one or more GDR pictures.

Aspect 19. The apparatus of any of Aspects 17 to 18, wherein to set the value of the flag of the AUD to 1, after the extracting of the second AU, the second AU is an IRAP AU or a GDR AU.

Aspect 20. A method comprising: storing one or more pictures associated with an access unit in a decoded picture buffer, the AU comprising a first plurality of pictures, the first plurality of pictures corresponding to a plurality of video coding layers; after each picture of a second plurality of pictures is removed from a coded picture buffer (CPB), removing at least one picture of the one or more pictures associated with the AU from the DPB; and storing, in the DPB, each picture of the second plurality of pictures removed from the CPB.

Aspect 21. The method of Aspect 20, further comprising removing the at least one picture of the one or more pictures from the DPB after a last decoding unit of each picture of the second plurality of pictures is removed from the CPB.

Aspect 22. The method of any of Aspects 20 to 21, further comprising: marking the at least one picture of the one or more pictures in the DPB for removal from the DPB; and based on the marking of the at least one picture of the one or more pictures in the DPB, removing the at least one picture of the one or more pictures from the DPB.

Aspect 23. The method of any of Aspects 20 to 22, further comprising setting a respective flag associated with the at least one picture of the one or more pictures, the respective flag indicating that the at least one picture of the one or more pictures is set for output from the DPB.

Aspect 24. The method of any of Aspects 20 to 23, wherein the DPB has a size limit that is signaled via a syntax element that defines the size limit of the DPB.

Aspect 25. The method of Aspect 24, wherein the size limit is less than at least a portion of the first plurality of pictures associated with the AU.

Aspect 26. The method of any of Aspects 20 to 25, wherein the at least one picture of the one or more pictures is removed from the DPB and each picture of the second plurality of pictures is stored in the DPB prior to an amount of used storage of the DPB reaching a size limit of the DPB.

Aspect 27. The method of any of Aspects 20 to 26, wherein the one or more pictures stored in the DPB comprise at least one of a reference picture and a decoded picture.

Aspect 28. The method of any of Aspects 20 to 27, wherein the at least one picture of the one or more pictures removed from the DPB comprises different pictures from a same layer of the plurality of video coding layers.

Aspect 29. The method of any of Aspects 20 to 27, wherein the at least one picture of the one or more pictures removed from the DPB comprises different pictures from different layers of the plurality of video coding layers.

Aspect 30. The method of any of Aspects 20 to 29, wherein each video coding layer among the plurality of video coding layers is associated with a same output time from the DPB.

Aspect 31. The method of any of Aspects 20 to 30, further comprising: extracting a second AU from at least a portion of a bitstream; determining that the second AU comprises only one or more intra random access point (IRAP) pictures or only one or more gradual decoder refresh (GDR) pictures; and based on the determining that the second AU comprises only one or more TRAP pictures or only one or more GDR pictures, setting a value of a flag of an AU delimiter associated with the second AU to 1, wherein the value of the flag when set to 1 indicates that the second AU contains only one or more IRAP pictures or only one or more GDR pictures.

Aspect 32. The method of Aspect 31, wherein the flag comprises an AUD TRAP or GDR flag, and wherein the second AU comprises at least one of a single video coding layer and a single coded picture, the at least one of the single video coding layer and the single coded picture comprising only the one or more TRAP pictures or only the one or more GDR pictures.

Aspect 33. The method of any of Aspects 32 to 32, wherein setting the value of the flag of the AUD to 1 further comprises changing the value of the flag from 0 to 1 based on a determination that, after the extracting of the second AU, the second AU is an IRAP AU or a GDR AU.

Aspect 34. A non-transitory computer-readable medium having stored thereon instructions that, when executed by one or more processors, cause the one or more processors to perform a method according to any of Aspects 20 to 33.

Aspect 35. An apparatus comprising means for performing a method according to any of Aspects 20 to 33.

Aspect 36. The apparatus Aspect 35, wherein the apparatus includes a decoder.

Aspect 37. The apparatus of any of Aspects 35 to 36, wherein the apparatus includes an encoder.

Aspect 38. The apparatus of any of Aspects 35 to 37, wherein the apparatus is a mobile device.

Aspect 39. The apparatus of any of Aspects 35 to 38, further comprising a display configured to display pictures associated with the AU.

Aspect 40. The apparatus of any of Aspects 35 to 39, further comprising a camera configured to capture pictures.

Aspect 41. An apparatus comprising: memory; and one or more processors coupled to the memory, the one or more processors being configured to: obtain a bitstream of video data; extract an access unit (AU) from at least a portion of the bitstream; determine that the AU comprises only one or more intra random access point pictures or only one or more gradual decoder refresh pictures; and based on the determining that the AU comprises only one or more TRAP pictures or only one or more GDR pictures, set a value of a flag of an AU delimiter associated with the AU to 1, wherein the flag having the value set to 1 indicates that the AU only contains one or more IRAP pictures or one or more GDR pictures.

Aspect 42. The apparatus of Aspect 41, wherein the flag comprises an AUD IRAP or GDR flag.

Aspect 43. The apparatus of any of Aspects 41 to 42, wherein the AU comprises at least one of a single video coding layer and a single coded picture.

Aspect 44. The apparatus of Aspect 43, wherein the at least one of the single video coding layer and the single coded picture comprises only the one or more IRAP pictures or only the one or more GDR pictures.

Aspect 45. The apparatus of any of Aspects 41 to 44, wherein the one or more processors are configured to: determine that, after the extracting of the AU, the AU is an IRAP AU or a GDR AU.

Aspect 46. The apparatus of Aspect 45, wherein the one or more processors are further configured to change the value of the flag from 0 to 1 based on the determining that, after the extracting of the AU, the AU is an IRAP AU or a GDR AU.

Aspect 47. The apparatus of any of Aspects 41 to 46, wherein the apparatus includes a decoder.

Aspect 48. The apparatus of any of Aspects 41 to 47, further comprising a display configured to display one or more pictures associated with the AU.

Aspect 49. The apparatus of any of Aspects 41 to 48, wherein the apparatus includes an encoder.

Aspect 50. The apparatus of any of Aspects 41 to 49, further comprising a camera configured to capture pictures associated with the AU.

Aspect 51. The apparatus of any of Aspects 41 to 50, wherein the apparatus is a mobile device.

Aspect 52. A method comprising: obtaining a bitstream of video data; extracting an access unit (AU) from at least a portion of the bitstream; determining that the AU comprises only one or more intra random access point pictures or only one or more gradual decoder refresh pictures; and based on the determining that the AU comprises only one or more TRAP pictures or only one or more GDR pictures, setting a value of a flag of an AU delimiter associated with the AU to 1, wherein the flag having the value set to 1 indicates that the AU contains only one or more IRAP pictures or only one or more GDR pictures.

Aspect 53. The method of Aspect 52, wherein the flag comprises an AUD TRAP or GDR flag.

Aspect 54. The method of any of Aspects 52 to 53, wherein the AU comprises at least one of a single video coding layer and a single coded picture.

Aspect 55. The method of Aspect 54, wherein the at least one of the single video coding layer and the single coded picture comprises only the one or more TRAP pictures or only the one or more GDR pictures.

Aspect 56. The method of any of Aspects 52 to 55, further comprising: determining that, after the extracting of the AU, the AU is an IRAP AU or a GDR AU.

Aspect 57. The method of Aspect 56, wherein setting the value of the flag of the AUD to 1 further comprises changing the value of the flag from 0 to 1 based on the determining that, after the extracting of the AU, the AU is an IRAP AU or a GDR AU.

Aspect 58. A non-transitory computer-readable medium having stored thereon instructions which, when executed by one or more processors, cause the one or more processors to perform a method according to any of Aspects 52 to 57.

Aspect 59. An apparatus comprising means for performing a method according to any of Aspects 52 to 57.

Aspect 60. The apparatus of Aspect 59, wherein the apparatus includes a decoder.

Aspect 61. The apparatus of any of Aspects 59 to 60, further comprising a display configured to display one or more pictures associated with the AU.

Aspect 62. The apparatus of any of Aspects 59 to 61, wherein the apparatus includes an encoder.

Aspect 63. The apparatus of any of Aspects 59 to 62, further comprising a camera configured to capture pictures associated with the AU.

Aspect 64. The apparatus of any of Aspects 59 to 63, wherein the apparatus is a mobile device.

What is claimed is:

1. An apparatus for processing video data, comprising:
   memory; and
   one or more processors coupled to the memory, the one or more processors being configured to:
      store a first plurality of pictures associated with an access unit (AU) in a decoded picture buffer (DPB), the AU comprising the first plurality of pictures and a second plurality of pictures, the first plurality of pictures corresponding to a plurality of video coding layers;
      mark at least one picture of the first plurality of pictures associated with the AU in the DPB for removal from the DPB;
      after a first picture of the second plurality of pictures associated with the AU is removed from a coded picture buffer (CPB), remove the at least one picture of the first plurality of pictures associated with the AU from the DPB based on the marking of the at least one picture for removal from the DPB;
      mark at least one additional picture of the first plurality of pictures associated with the AU in the DPB for removal from the DPB;
      after a second picture of the second plurality of pictures associated with the AU is removed from the CPB, remove the at least one additional picture of the first plurality of pictures associated with the AU from the DPB based on the marking of the at least one additional picture for removal from the DPB; and
      store, in the DPB, at least the first picture and the second picture of the second plurality of pictures removed from the CPB.

2. The apparatus of claim 1, wherein the one or more processors are configured to remove the at least one picture from the DPB after a last decoding unit (DU) of the first picture of the second plurality of pictures associated with the AU is removed from the CPB.

3. The apparatus of claim 1, wherein, the one or more processors are further configured to set a respective flag associated with the at least one picture of the first plurality of pictures, the respective flag indicating that the at least one picture of the first plurality of pictures is set for output from the DPB.

4. The apparatus of claim 1, wherein the DPB has a size limit that is signaled via a syntax element that defines the size limit of the DPB.

5. The apparatus of claim 1, the one or more processors being configured to remove the at least one picture of the first plurality of pictures from the DPB and store at least the first picture and the second picture of the second plurality of pictures in the DPB prior to an amount of used storage of the DPB reaching a size limit of the DPB.

6. The apparatus of claim 1, wherein the first plurality of pictures stored in the DPB comprise at least one of a reference picture or a decoded picture.

7. The apparatus of claim 1, wherein the at least one picture of the first plurality of pictures removed from the DPB comprises a plurality of pictures, the plurality of pictures including different pictures from a same layer of the plurality of video coding layers.

8. The apparatus of claim 1, wherein the at least one picture of the first plurality of pictures removed from the DPB comprises a plurality of pictures, the plurality of pictures including different pictures from different layers of the plurality of video coding layers.

9. The apparatus of claim 1, wherein each video coding layer among the plurality of video coding layers is associated with a same output time from the DPB.

10. The apparatus of claim 1, wherein the apparatus includes a decoder.

11. The apparatus of claim 10, further comprising a display configured to display one or more output pictures from the DPB.

12. The apparatus of claim 1, wherein the apparatus includes an encoder.

13. The apparatus of claim 12, further comprising a camera configured to capture pictures associated with the AU.

14. The apparatus of claim 1, wherein the apparatus is a mobile device.

15. A method of processing video data, comprising:
   storing a first plurality of pictures associated with an access unit (AU) in a decoded picture buffer (DPB), the AU comprising the first plurality of pictures and a second plurality of pictures, the first plurality of pictures corresponding to a plurality of video coding layers;
   marking at least one picture of the first plurality of pictures associated with the AU in the DPB for removal from the DPB;
   after a first picture of the second plurality of pictures associated with the AU is removed from a coded picture buffer (CPB), removing the at least one picture of the first plurality of pictures associated with the AU from the DPB based on the marking of the at least one picture for removal from the DPB;
   marking at least one additional picture of the first plurality of pictures associated with the AU in the DPB for removal from the DPB;
   after a second picture of the second plurality of pictures associated with the AU is removed from the CPB, removing the at least one additional picture of the first plurality of pictures associated with the AU from the DPB based on the marking of the at least one additional picture for removal from the DPB; and
   storing, in the DPB, at least the first picture and the second picture of the second plurality of pictures removed from the CPB.

16. The method of claim 15, further comprising removing the at least one picture from the DPB after a last decoding unit (DU) of the first picture of the second plurality of pictures associated with the AU is removed from the CPB.

17. The method of claim 15, further comprising setting a respective flag associated with the at least one picture of the first plurality of pictures, the respective flag indicating that the at least one picture of the first plurality of pictures is set for output from the DPB.

18. The method of claim 15, wherein the DPB has a size limit that is signaled via a syntax element that defines the size limit of the DPB.

19. The method of claim 15, wherein the first plurality of pictures stored in the DPB comprise at least one of a reference picture or a decoded picture.

20. The method of claim 15, wherein the at least one picture of the first plurality of pictures removed from the DPB comprises a plurality of pictures, the plurality of pictures including different pictures from a same layer of the plurality of video coding layers.

21. The method of claim 15, further comprising removing the at least one picture of the first plurality of pictures from the DPB and store at least the first picture and the second picture of the second plurality of pictures in the DPB prior to an amount of used storage of the DPB reaching a size limit of the DPB.

22. The method of claim 15, wherein each video coding layer among the plurality of video coding layers is associated with a same output time from the DPB.

23. The method of claim 15, wherein the at least one picture of the first plurality of pictures removed from the DPB comprises a plurality of pictures, the plurality of pictures including different pictures from different layers of the plurality of video coding layers.

24. A non-transitory computer-readable medium having stored thereon instructions that, when executed by one or more processors, cause the one or more processors to:
store a first plurality of pictures associated with an access unit (AU) in a decoded picture buffer (DPB), the AU comprising the first plurality of pictures and a second plurality of pictures, the first plurality of pictures corresponding to a plurality of video coding layers;
mark at least one picture of the first plurality of pictures associated with the AU in the DPB for removal from the DPB,
after a first picture of the second plurality of pictures associated with the AU is removed from a coded picture buffer (CPB), remove the at least one picture of the first plurality of pictures associated with the AU from the DPB based on the marking of the at least one picture for removal from the DPB;
mark at least one additional picture of the first plurality of pictures associated with the AU in the DPB for removal from the DPB;
after a second picture of the second plurality of pictures associated with the AU is removed from the CPB, remove the at least one additional picture of the first plurality of pictures associated with the AU from the DPB based on the marking of the at least one additional picture for removal from the DPB; and
store, in the DPB, at least the first picture and the second picture of the second plurality of pictures removed from the CPB.

* * * * *